Patented May 11, 1943

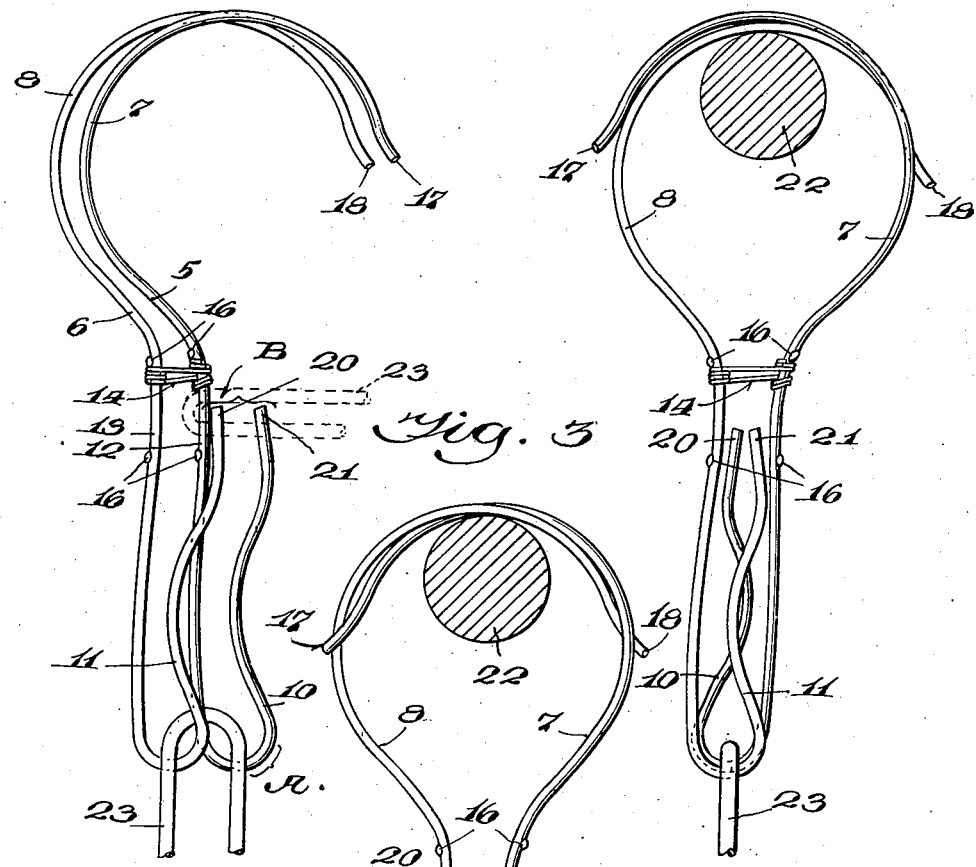

2,319,180

UNITED STATES PATENT OFFICE 2,319,180

COUPLER OR HOOK

Albert J. Gore, Washington, D. C.

Application November 30, 1942, Serial No. 467,419

6 Claims. (Cl. 24—236)

This invention relates to couplers or double end hooks adapted to connect any two members. It is subject to a variety of uses and applications wherever desired. For example, it may connect one member to another in such relation as to prevent normal separation of the two members. A specific example might be the support of a pail from a ladder as used by painters or fruit pickers and the invention will be hereinafter described with relation to such use but, of course, not limited thereto.

One of the objects of the present invention is to provide a strong and safe coupler of the above general character of simple and practical construction which may be easily and quickly manipulated to hold the parts in desired position.

A further object is to provide a device of the above character in which the hook parts of the device may be easily and quickly applied to the supporting member, as well as the member to be supported, and to hold such parts of the device in fixed relation thereby to prevent disassembly or disconnection of the parts while in use or until desired to disconnect them.

A further object is to provide a device of the above character in which the hook members, after being connected to either or both the supporting member and the member to be supported, are easily and quickly manipulated into interlocking relation to prevent accidental separation.

A further object is to provide a device of the last above mentioned character with a safety lock whereby one or the other of the hook members is retained in its interlocking position and cannot be freed from such position without specific intentions.

Other objects will be in part obvious from the annexed drawing and in part hereinafter indicated in connection therewith by the following analysis of the invention.

This invention accordingly consists in the features of construction, combination of parts and in the unique relation of the members and in the relative proportioning and disposition thereof, all as more completely outlined herein.

To enable others skilled in the art to fully comprehend the underlying features of this invention, that they may embody the same by the numerous modifications in structure and relation contemplated by the invention, drawings depicting a preferred form of the invention have been annexed as part of this disclosure, and in such drawing like characters of reference denote corresponding parts throughout all of the views, in which:

Figure 1 is an elevational view showing the parts in unattached position, one part being shaded more heavily than the other in order that the parts of the respective elements may be more clearly discerned;

Figure 2 is a similar view showing the parts applied to the supporting member and the member to be supported;

Figure 3 is a similar view with the various parts in final inetrlocked position.

Referring now to the drawing in detail, 5 and 6 indicate two similarly shaped hook members preferably made from bent wire or the like although some plastics are sufficiently strong. Each part has an upper hook 7 and 8 and a lower part 10 and 11, respectively. The central parts of these members are connected in any desired manner but as shown, two substantially straight portions 12 and 13 on the members are connected by a locking universal pivot and connecting member 14 which may also be of wire in the shape of a flattened O formed by twisting a separate piece of wire substantially as shown in Figure 1. This link member 14 is free to slide to a limited extent on the parts 12 and 13 between projections 16 on these parts but retain the position to which it is moved by friction. These projections may be either flattened portions of the wire or possibly small globules of solder applied thereto.

It will be noted that the ends of the upper hook members 7 and 8 are slightly bent out of the plane of the body parts as indicated at 17 and 18 whereby, when positioned as shown in Figure 2, these ends may be moved or twisted down and under the parts 7 and 8, respectively, into the interlocking relation shown in Figure 3, and the inherent resiliency of the material causes the parts to remain in this position. The lower hooks 10 and 11 extend upwardly and are bent to overlap or cross each other as shown in Figure 2, which permits the extreme bent ends 20 and 21 to be moved or twisted relative to each other, that is, from the position shown in Figure 2 to that shown in Figure 3, thus, acquiring an interlocking relation in which each part laterally presses against the other whereupon the locking link 14 is lowered to embrace these two ends 20 and 21 and prevent untwisting until the link is raised.

The operation of this device may, of course, be varied according to the circumstances and its particular application. However, assuming that the device is being used by a painter or workman who desires to support a pail from the rung of a ladder indicated at 22 and the bail or handle of the path is indicated at 23. A convenient way of attaching the pail to the lower hook members is to pass the bail upwardly as indicated by the arrow A over the lower hook member 10 only until it reaches the dotted line position near the central part of Figure 1, whereupon the bail, while surrounding both portions of the hook 10 is then lowered in the direction of the arrow B to include the very top of the hook 20 and until it assumes the position shown at the lower part of Figure 1. Then, the two parts of the entire device are turned relatively through 180° and while spaced transversely apart may be slipped up the opposite sides of the rung 22 and then given a right angle turn, whereupon the hook parts asume the position shown in Figure 2. By simply moving by a twisting action the upper parts of the hooks 7 and 8 will assume the interlocking position shown in Figure 3 with one part laterally pressing against the other. Likewise, by twisting the upper ends 20 and 21 of the lower hook members they will move from the position shown in Figure 2 to that shown in Figure 3 and on lowering the auxiliary locking means 14 from the position shown in Figure 2 to that shown in Figure 3, then the twisted wires are held securely in their interlocking relation.

To release either or both the supported member or supporting member, the reverse operation takes place.

From the above it will be seen that the present invention comprises a simple and practical mechanism which may be inexpensively manufactured from various materials such as ordinary wire of the proper degree of resiliency and tensile strength and when completed may be easily and quickly applied to the supporting and supported members and the ends moved into safe interlocking position and maintained in such position.

While we have only described one of the various modifications and uses of the invention, it is, of course, to be understood that it may be applied to any two members adapted to be connected or supported one from the other and the following claims are to be interpreted accordingly.

I claim:

1. A coupler or interlocking device of the character described for connecting two parts, comprising two similarly bent wire-like members each having two hook portions, loose connecting means near the central parts of said members to permit said members to move relatively to each other, at least one pair of said hooks terminating in outwardly bent ends whereby the hooks and ends may be twisted into interlocking position and embrace one of the parts to be connected.

2. A coupler or interlocking device of the character described for connecting two parts, comprising two similarly shaped wire-like members each having two hook portions, connecting means near the central parts of said members to permit said members to pivot relatively to each other, both ends of said coupler being movable into position to embrace the parts to be connected and the hooks at one end terminating in outwardly flared ends to be twisted laterally into interlocking relation with the body part of said hook portions.

3. A coupler or interlocking hook of the character described for connecting two parts, comprising two similarly shaped bent members each having two hook portions facing same directions and having a connecting link near their central parts, said link being loosely connected to said hooks to permit all of said parts to move relatively to each other, both ends of said hooks having bent ends thereby to be twisted into interlocking position about the parts to be connected.

4. A coupler or interlocking hook of the character described for connecting two parts, comprising two similarly shaped bent members each having two hook portions facing same directions and having a connecting link near their central parts, said link being frictionally connected to said hooks to permit said parts to turn relatively to each other and slidable on said hooks, at least one pair of ends of said hooks being outwardly bent and being movable into interlocking position about one of the parts to be connected, said link being slidable on said hooks over one pair of the interlocking ends to provide a further lock.

5. A coupler or interlocking hook of the character described for connecting two parts, comprising two similarly shaped bent wires each having two hook portions facing the same direction and having a connecting link near their central parts, said link being frictionally connected to said hooks to permit said parts to turn relatively to each other and slidable to a limited extent on said hooks, both ends of said hooks being bent to permit them to be twisted into interlocking position about the parts to be connected, and means to limit the sliding movement, said link being slidable downwardly on said hooks over one pair of the interlocking ends to provide a further lock.

6. A coupler or interlocking hook of the character described for connecting two parts comprising two similarly shaped bent members each having two hook portions facing the same direction, the upper hook being the larger and having a connecting link near their central parts, said link being connected to said hooks to permit said parts to move relatively to each other and slidable on said hooks, both ends of said hooks being bent to permit them to be twisted into interlocking position about the parts to be connected, said link being slidable on said hooks over the lower and smaller hooks and to rest there by gravity to prevent untwisting of said lower hooks.

ALBERT J. GORE.